(12) United States Patent
Weng

(10) Patent No.: US 6,710,924 B1
(45) Date of Patent: Mar. 23, 2004

(54) SPECTROSCOPE WITH MULTIPLE LASER BEAMS

(75) Inventor: Kevin Weng, Keelung (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 10/456,698

(22) Filed: Jun. 6, 2003

(30) Foreign Application Priority Data

Oct. 4, 2002 (TW) ........................ 91215727 U

(51) Int. Cl.⁷ .................. G02B 27/10; G02B 27/14; G02B 5/04; G02B 5/08
(52) U.S. Cl. .................. 359/618; 359/636; 359/834; 359/866
(58) Field of Search .................. 359/618, 627–629, 359/633, 636, 831, 833, 834, 836, 866, 741, 742, 471, 482

(56) References Cited

U.S. PATENT DOCUMENTS

| | | | | |
|---|---|---|---|---|
| 6,327,090 B1 | * | 12/2001 | Rando et al. | 359/618 |
| 6,529,329 B2 | * | 3/2003 | Dang | 359/618 |
| 6,542,304 B2 | * | 4/2003 | Tacklind et al. | 359/618 |

* cited by examiner

Primary Examiner—Georgia Epps
Assistant Examiner—Jack Dinh
(74) Attorney, Agent, or Firm—Raymond Sun

(57) ABSTRACT

A spectroscope has a body having a front surface, a rear surface, and a concavity provided in the rear surface. The concavity is defined by a plurality of angled reflective surfaces. A laser beam directed at the front surface is divided into a plurality of branch laser beams, with one branch laser beam generated for each of the plurality of reflective surfaces.

19 Claims, 5 Drawing Sheets

SPECTROSCOPE WITH MULTIPLE LASER BEAMS

BACKGROUND OF THE INVENTION

1. Field of the Invention

The invention relates to a spectroscope which produces multiple laser beams.

2. Description of the Prior Art

U.S. Pat. No. 6,327,090B1, entitled "Multiple Laser Beam Generation" illustrates a reflecting object 10 that has a plurality of reflecting surfaces, with the reflecting object made of a glass material. This reflecting object 10 is shown in FIG. 1 herein. Referring to FIG. 1, four protruding reflecting surfaces 11, 12, 13 and 14 are provided, with the angle between each reflecting surfaces 11, 12, 13 and 14 and a laser beam 20 being 45 degrees. A fifth reflecting surface 15 is positioned to allow the laser beam 20 to pass directly therethrough. As the laser beam 20 passes through the reflecting object 10, the laser beam 20 is divided into five branch laser beams 21, 22, 23, 24 and 25. Since the fifth reflecting surface 15 is perpendicular to the laser beam 20 (i.e., there is no any refraction angle between them), a further hole (not shown) can be provided for the laser beam 20 to pass through directly.

The reflecting object 10 in U.S. Pat. No. 6,327,090B1 is essentially a glass material positioned in a path where the laser beam 20 travels, so the laser beam 20 travels from a medium with low refraction index to another medium with high refraction index. Therefore each reflecting surface 11, 12, 13 and 14 must be coated with a reflective coating, otherwise there may little or no reflection of the incoming laser beam 20. For example, in such a situation, only about 4% of the laser beam 20 might be reflected, with the other 96% passing directly through the reflecting object 10. Since the laser beam 20 is intended to pass directly through the fifth reflecting surface 15, a reflective coating is not needed for the fifth reflecting surface 15. However, the reflecting object 10 in U.S. Pat. No. 6,327,090B1 still suffers from the following disadvantages:

1. Reflective coatings are needed for each reflecting surface 11, 12, 13 and 14, which increases the cost of the reflecting object 10.

2. The glass material that makes up the reflecting object 10 must be grinded precisely, which requires complicated manufacturing processes that do not allow for mass-production, thereby increasing manufacturing costs.

SUMMARY OF THE DISCLOSURE

It is an objective of the present invention to provide a spectroscope that produces multiple laser beams without the need for any coatings on the reflective surfaces.

It is another objective of the present invention to provide a spectroscope that can be formed by injection molding or glass sintering.

It is another objective of the present invention to provide a spectroscope that can be mass-produced at lower manufacturing costs.

It is another objective of the present invention to provide a spectroscope that is capable of increasing or decreasing the number of laser beams generated.

In order to accomplish the objectives of the present invention, the present invention provides a spectroscope that has a body having a front surface, a rear surface, and a concavity provided in the rear surface. The concavity is defined by a plurality of angled reflective surfaces and an inner flat surface, with the inner flat surface being perpendicular to a longitudinal axis and parallel to the front surface. A laser beam directed at the front surface is divided into a plurality of branch laser beams, with one branch laser beam generated for each of the plurality of reflective surfaces and the inner flat surface.

Due to the fact that the laser beam is emitted from a medium having a high refraction index through a medium having a low refraction index, and an incident angle that is greater than a critical angle of total internal refraction, when the laser beam contacts the reflective surfaces of the concavity, a total internal reflection feature is provided, thereby omitting the need for coatings and allowing for the spectroscope to be mass-produced at low cost while maintaining a high degree of precision and manufacturing consistency.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
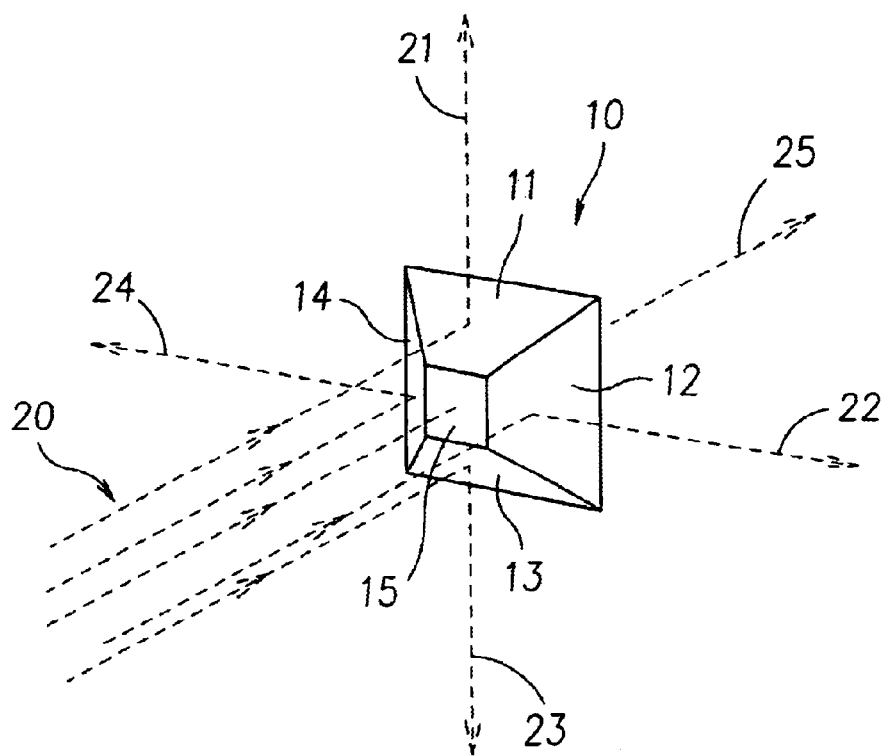
FIG. 1 is a perspective view of a prior art reflecting object.
Figure 2A:
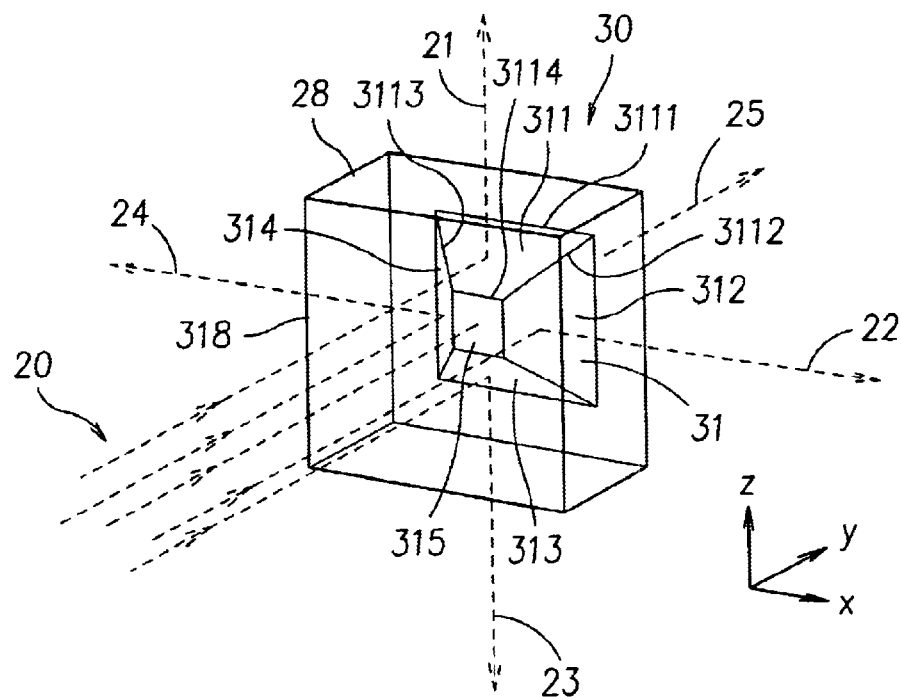
FIG. 2A is a perspective view of a spectroscope according to one embodiment of the present invention.
Figure 2B:
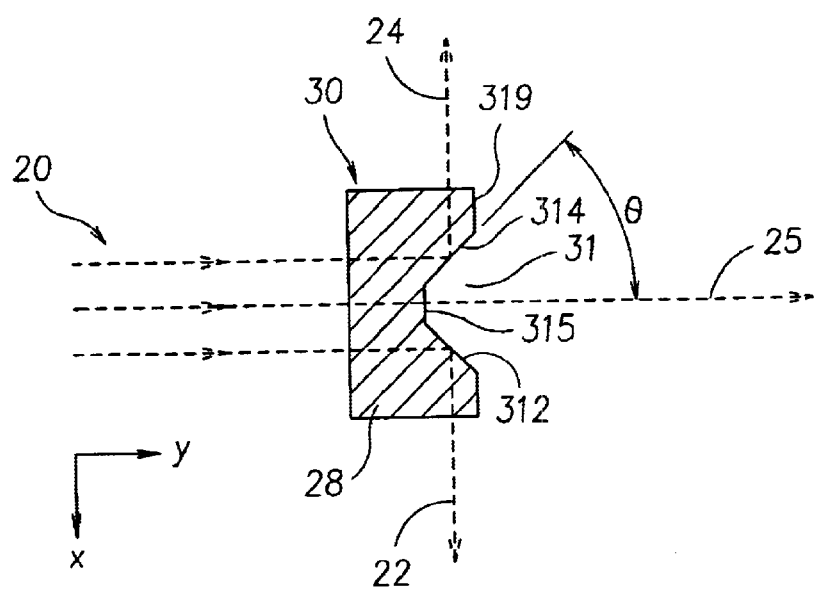
FIG. 2B is a top cross-sectional view of the spectroscope of FIG. 2A.

FIGS. 2A and 2B illustrate one embodiment of a spectroscope 30 according to the present invention. The spectroscope 30 has a body 28, with a concavity 31 sunken into a rear surface 319 of the body 28. The concavity 31 has a plurality (e.g., four) of angled reflective surfaces 311, 312, 313 and 314. The angle E between each reflective surface 311, 312, 313 and 314 and a longitudinal axis (which is represented by the travel path of a laser beam 20) is 45 degrees. Each reflecting surface 311, 312, 313 and 314 has four edges, an outer edge 31 11, two side edges 3112, 3113, and an inner edge 3114. The concavity 31 is configured so that its dimension decreases from the rear surface 319 of the spectroscope 30 towards its flat inner-most surface 315. In other words, the outer edge 3111 is longer than the inner edge 3114, and each side edge 3112, 3113 is angled from the outer edge 3111 towards the inner edge 3114. In addition, the four edges 3111, 3112, 3113, 3114 are symmetrically positioned in the concavity 31. In other words, each of these four edges for a particular reflecting surface 311, 312, 313 or 314 is symmetrical to the corresponding edge of the other reflecting surfaces 311, 312, 313 or 314. The concavity 31 has a central axial portion, which is defined as a flat surface 315 that is perpendicular to the longitudinal axis which is represented by the laser beam 20. The flat surface 315 allows the laser beam 20 to penetrate therethrough with no any reflecting angle.

The laser beam 20 is emitted into the spectroscope 30 through a front surface 318 of the spectroscope, which is adjacent the flat surface 315 of the concavity 31. When the laser beam 20 penetrates the front surface 318 and the body 28, the laser beam 20 contacts the reflective surfaces 311, 312, 313 and 314, and the laser beam 20 is split into a plurality of branch laser beams 21, 22, 23 and 24 (i.e., one branch laser beam for each reflective surface 311, 312, 313 and 314). In one preferred embodiment, the angle θ between each reflective surface 311, 312, 313 and 314 and the laser beam 20 is 45 degrees, so that each branch laser beam 21, 22, 23 and 24 can extend in a direction that is perpendicular (i.e., 90 degrees) to the direction of the laser beam 20. Part of the laser beam 20 passes through the flat surface 315. The laser beam 20 emitted at the reflective surfaces 311, 312, 313 and 314 is defined as a light traveling from a medium with a high refraction index (i.e., the body 28 of the spectroscope) into another medium with a low refraction index (i.e., air). In addition, each incident angle is greater than a critical angle of total internal reflection. In this regard, for incident angles greater than or equal to the critical angle of total internal reflection, all the incoming energy is reflected back into the incident medium in the process known as total internal reflection. Thus, a total reflection feature is provided by the present invention. In other words, the reflective surfaces 311, 312, 313 and 314 have the effect of providing a total reflection without the need for any coating. As a result, the spectroscope 30 can be made of injection molding or glass sintering without grinding, so that the spectroscope 30 can be mass-produced at low cost while maintaining a high degree of precision and manufacturing consistency.

Figure 3A:
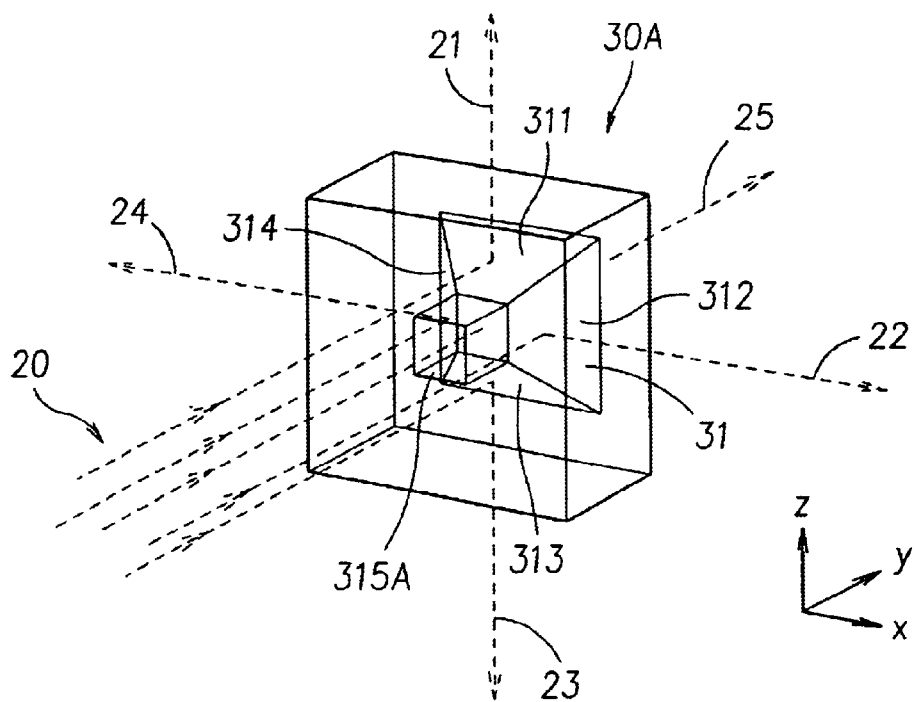
FIG. 3A is a perspective view of a spectroscope according to another embodiment of the present invention.
Figure 3B:
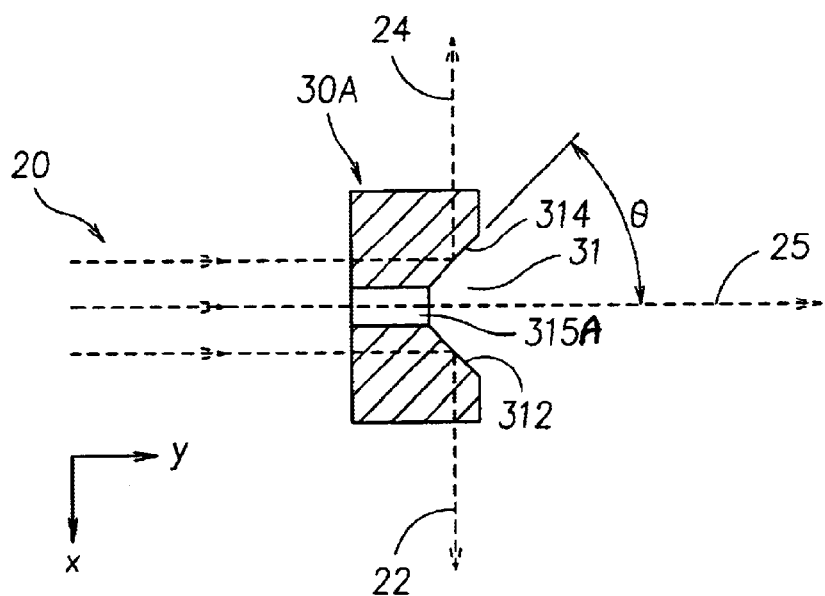
FIG. 3B is a top cross-sectional view of the spectroscope of FIG. 3A.

FIGS. 3A and 3B illustrate another embodiment of a spectroscope 30A according to the present invention. The spectroscope 30A in FIGS. 3A and 3B has the same construction as the spectroscope 30 in FIGS. 2A and 2B, except that the central axial portion (i.e., the flat surface 315) of the concavity 31 of the spectroscope 30A is now replaced by an empty bore 3115A so that the laser beam 20 is emitted through the bore 315A without any reflecting angle. Other than this modification, the other elements in the two spectroscopes 30 and 30A of FIGS. 2A–2B and 3A–3B, respectively, are identical and are therefore designated by the same numeral designations.

Figure 4:
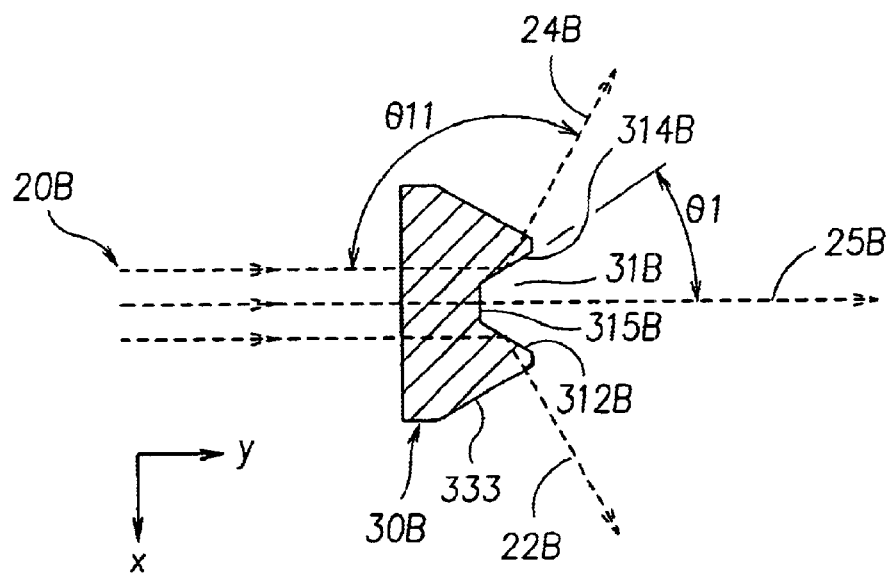
FIGS. 4 and 5 are top cross-sectional views of two other embodiments of spectroscopes according to the present invention.
Figure 5:
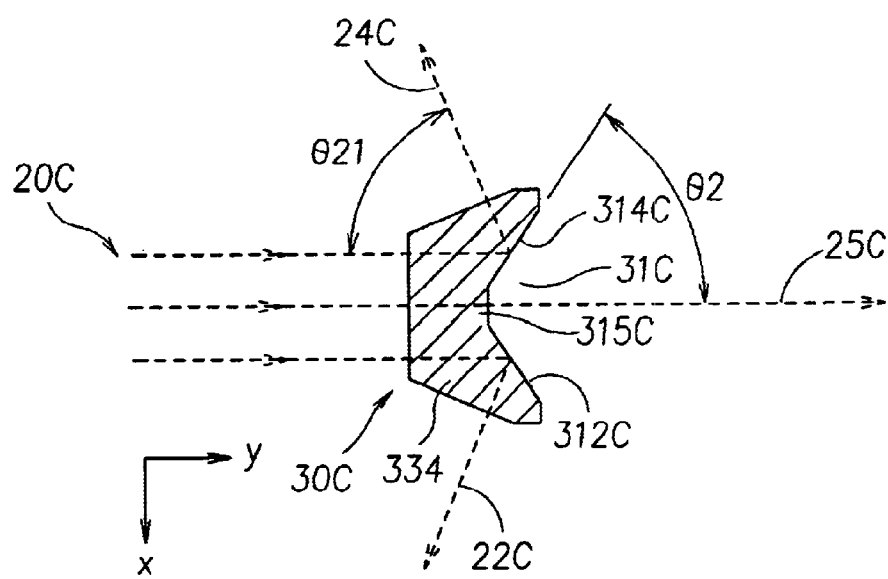

The embodiments in FIGS. 4 and 5 will illustrate that, by varying the angles of the reflective surfaces 311, 312, 313, 314 with respect to the longitudinal axis (i.e., path of the laser beam 20), it is possible to produce branch laser beams 21, 22, 23, 24 with varying angles.

FIG. 4 is a top cross-sectional view of another embodiment of a spectroscope 30B according to the present invention. The spectroscope 30B in FIG. 4 has the same construction as the spectroscope 30 in FIGS. 2A and 2B, except that the angle θ1 between each reflective surface 312B, 314B and a longitudinal axis (which is represented by the travel path of a laser beam 20B) is less than 45 degrees, which results in the branch laser beams 22B and 24B being reflected from the reflective surfaces 312B, 314B, respectively, at an angle θ11 that is greater than 90 degrees with respect to the laser beam 20B.

In addition, the external surface 333 of the spectroscope 30B can be oriented at an angle (with respect to the longitudinal axis) where the surface 333 would be generally perpendicular to the reflected laser beam (e.g., 22B and 24B) so that the surface 333 would not further refract these laser beams (e.g., 22B and 24B). As an alternative, the surface 333 can be oriented at angles (with respect to the longitudinal axis) where the surface 333 would not be perpendicular to the reflected laser beam (e.g., 22B and 24B) so that the surface 333 would further refract these laser beams (e.g., 22B and 24B). Thus, orienting the surface 333 at different angles will adjust the orientation of the resultant branch laser beams (e.g., 22B and 24B).

Other than these two modifications, the other elements in the two spectroscopes 30 and 30B of FIGS. 2A–2B and 4, respectively, are identical and are therefore designated by the same numeral designations, except that a "B" has been added to the designations in FIG. 4.

FIG. 5 is a top cross-sectional view of another embodiment of a spectroscope 30C according to the present invention. The spectroscope 30C in FIG. 5 has the same construction as the spectroscope 30 in FIGS. 2A and 2B, except that the angle θ2 between each reflective surface 312C, 314C and a longitudinal axis (which is represented by the travel path of a laser beam 20C) is greater than 45 degrees, which results in the branch laser beams 22C and 24C being reflected from the reflective surfaces 312C, 314C, respectively, at an angle θ21 that is less than 90 degrees with respect to the laser beam 20C. In addition, the external surface 334 of the spectroscope 30C can be oriented at different angles (with respect to the longitudinal axis) in the same manner as described above for the surface 333 of the spectroscope 30C to adjust the orientation of the resultant branch laser beams (e.g., 22C and 24C). Other than these modifications, the other elements in the two spectroscopes 30 and 30C of FIGS. 2A–2B and 5, respectively, are identical and are therefore designated by the same numeral designations, except that a "C" has been added to the designations in FIG. 5.

Figure 6A:
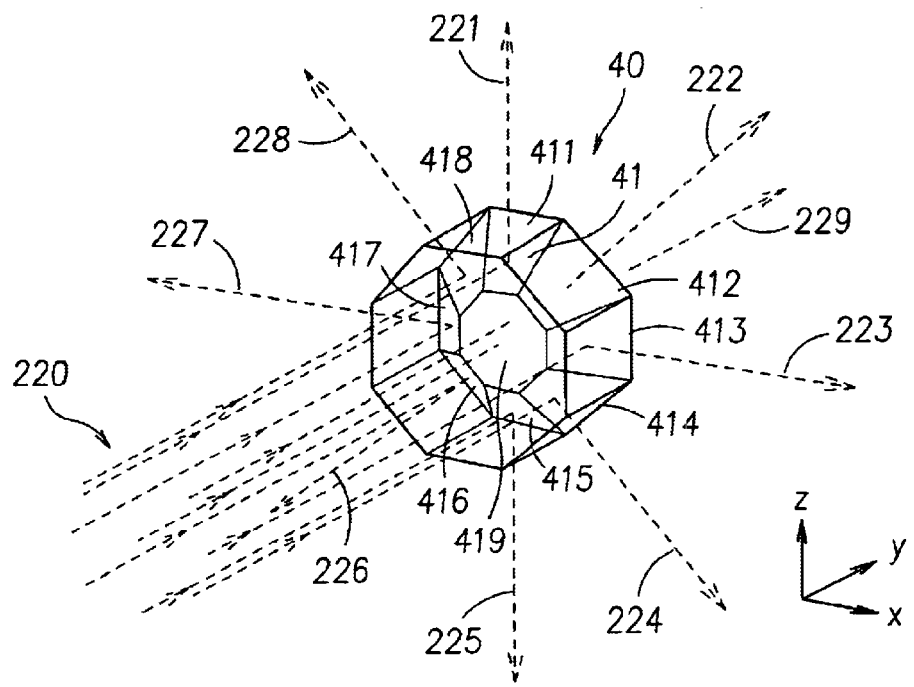
FIG. 6A is a perspective view of a spectroscope according to yet another embodiment of the present invention.
Figure 6B:
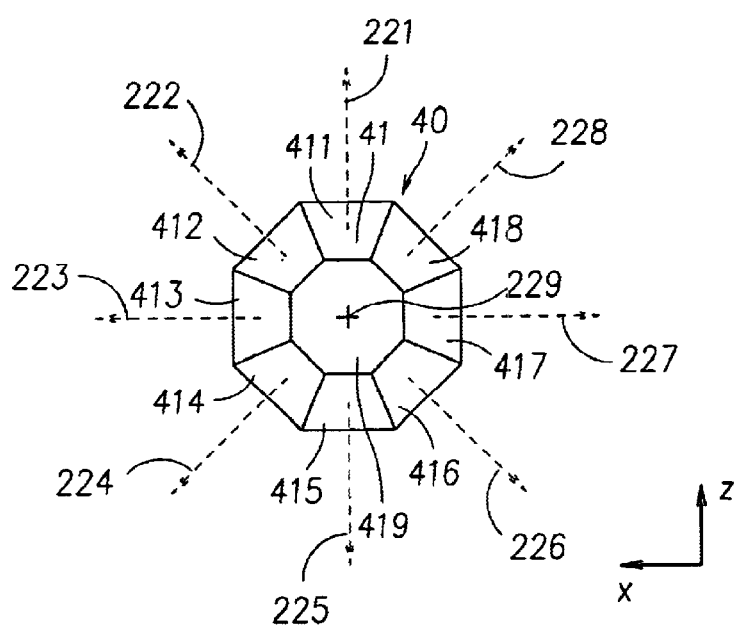
FIG. 6B is a front elevation view of the spectroscope of FIG. 6A.

FIGS. 6A and 6B illustrate another spectroscope 40 according to the present invention. The spectroscope 40 is shaped as an octagon and has an octagonal concavity 41. The concavity 41 has eight reflective surfaces 411, 412, 413, 414, 415, 416, 417 and 418, which are similar in construction to the reflective surfaces 311, 312, 313, 314 in FIGS. 2A and 2B. The concavity 41 also has a central flat surface 419 which can be the same as the surface 315 in FIGS. 2A and 28. Otherwise, the same operating principles apply to both the spectroscope 30 in FIGS. 2A and 2B and the spectroscope 40 in FIGS. 6A and 6B. In particular, when a laser beam 220 is emitted at the front surface of the spectroscope 40 in the manner shown in FIG. 6A, the octagonal concavity 41 of the spectroscope 40 generates eight branch laser beams 221, 222, 223, 224, 225, 226, 227 and 228. Since the flat surface 419 is perpendicular to the laser beam 220, the laser beam 220 passes therethrough to generate a ninth branch laser beam 229 that is an extension of the original laser beam 220.

The principles of FIGS. 4 and 5 can also be applied to the spectroscope 40 in FIGS. 6A and 6B.

Accordingly, the present invention provides spectroscopes that enjoy the following advantages:

1. By utilizing the theories of optical total reflection and refraction, coatings can be omitted.

2. No grinding, coatings or complicated adjusting mechanisms are needed in the manufacturing processes.

3. Since injection molding or glass sintering can be used for manufacturing the spectroscopes according to the present invention, the spectroscopes can be mass-produced at low cost, high precision and improved consistency.

4. The number and angles of the generated laser branch beams can be varied.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A spectroscope, comprising:

a body having a front surface, a rear surface, and a concavity provided in the rear surface, the concavity defined by a plurality of angled reflective surfaces and an inner flat surface, with the inner flat surface being perpendicular to a longitudinal axis and parallel to the front surface; and wherein a laser beam directed at the front surface is divided into a plurality of branch laser beams, with one branch laser beam generated for each of the plurality of reflective surfaces and the inner flat surface.

2. The device of claim 1, wherein the angle between each reflective surface and the longitudinal axis is 45 degrees.

3. The device of claim 2, wherein each branch laser beam extends at an angle of 90 degrees with respect to the laser beam.

4. The device of claim 1, wherein the angle between each reflective surface and the longitudinal axis is greater than 45 degrees.

5. The device of claim 4 wherein each branch laser beam extends at an angle of greater than 90 degrees with respect to the laser beam.

6. The device of claim 1, wherein the angle between each reflective surface and the longitudinal axis is less than 45 degrees.

7. The device of claim 6, wherein each branch laser beam extends at an angle of less than 90 degrees with respect to the laser beam.

8. The device of claim 1, wherein the plurality of reflective surface comprises four surfaces.

9. The device of claim 1, wherein the plurality of reflective surface comprises eight surfaces.

10. The device of claim 1, wherein each reflecting surface has an outer edge, an inner edge, and two side edges that connect the outer edge and the inner edge, with the outer edge being longer than the inner edge, and each side edge being angled from the outer edge towards the inner edge.

11. The device of claim 1, wherein the concavity is configured so that its dimension decreases from the rear surface towards the inner flat surface.

12. The device of claim 1, wherein the plurality of reflective surfaces in the concavity are symmetrically positioned in the concavity.

13. A spectroscope, comprising:

a body having a front surface, a rear surface, a bore and a concavity provided in the rear surface, the concavity defined by a plurality of angled reflective surfaces, and wherein the bore extends from the front surface to the concavity and defines a longitudinal axis; and wherein a laser beam directed at the front surface is divided into a plurality of branch laser beams, with one branch laser beam generated for each of the plurality of reflective surfaces, and one branch laser beam traveling through the bore.

14. The device of claim 13, wherein the angle between each reflective surface and the longitudinal axis is 45 degrees.

15. The device of claim 13, wherein the angle between each reflective surface and the longitudinal axis is greater than 45 degrees.

16. The device of claim 13, wherein the angle between each reflective surface and the longitudinal axis is less than 45 degrees.

17. The device of claim 13, wherein each reflecting surface has an outer edge, an inner edge, and two side edges that connect the outer edge and the inner edge, with the outer edge being longer than the inner edge, and each side edge being angled from the outer edge towards the inner edge.

18. The device of claim 13, wherein the concavity is configured so that its dimension decreases from the rear surface towards the bore.

19. The device of claim 13, wherein the plurality of reflective surfaces in the concavity are symmetrically positioned in the concavity.

* * * * *